United States Patent
Gu et al.

(10) Patent No.: US 9,760,523 B2
(45) Date of Patent: Sep. 12, 2017

(54) DOCKING STATION AND EXTERNAL DEVICE CONTROL METHOD AND SYSTEM UTILIZING THE DOCKING STATION

(71) Applicant: Huawei Device Co., Ltd., Shenzhen, Guangdong (CN)

(72) Inventors: Haifeng Gu, Shenzhen (CN); Lei Chen, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 483 days.

(21) Appl. No.: 14/339,064

(22) Filed: Jul. 23, 2014

(65) Prior Publication Data
US 2014/0337556 A1 Nov. 13, 2014

Related U.S. Application Data

(63) Continuation of application No. PCT/CN2013/072510, filed on Mar. 13, 2013.

(30) Foreign Application Priority Data

Mar. 14, 2012 (CN) .......................... 2012 1 0067125

(51) Int. Cl.
*G06F 13/00* (2006.01)
*G06F 13/42* (2006.01)
(Continued)

(52) U.S. Cl.
CPC ........ *G06F 13/4252* (2013.01); *G06F 1/1632* (2013.01); *H04L 29/06068* (2013.01)

(58) Field of Classification Search
CPC ... G06F 1/1632; G06F 13/4081; G06F 13/409
(Continued)

(56) References Cited

U.S. PATENT DOCUMENTS

| 6,615,299 B1 | 9/2003 | Chu et al. |
| 2007/0052868 A1 | 3/2007 | Chou et al. |

(Continued)

FOREIGN PATENT DOCUMENTS

| CN | 1866386 A | 11/2006 |
| CN | 101212631 A | 7/2008 |

(Continued)

OTHER PUBLICATIONS

"VastLane Mobile HD Link Bridge," SiI9190 Product Brief, Silicon Image Inc., Sunnyvale, California (2008).

*Primary Examiner* — Tim T Vo
*Assistant Examiner* — Kim T. Huynh
(74) *Attorney, Agent, or Firm* — Leydig, Voit & Mayer, Ltd.

(57) ABSTRACT

Embodiments of the present invention provide a docking station and an external device control method and system utilizing the docking station, which are capable of implementing simultaneous working of devices of two types of protocols through a same multiplexing interface. The external device control method includes: utilizing a docking station, where the docking station includes: a first protocol/second protocol multiplexing interface for connecting to a main device; at least one first protocol device interface for connecting to a first protocol external device; and at least one second protocol device interface for connecting to a second protocol external device. The method is: receiving first protocol data sent by the first protocol external device through the first protocol device interface; and converting the first protocol data into second protocol data, and sending the second protocol data to the main device through the first protocol/second protocol multiplexing interface.

12 Claims, 4 Drawing Sheets

(51) Int. Cl.
*G06F 1/16* (2006.01)
*H04L 29/06* (2006.01)

(58) Field of Classification Search
USPC ............... 710/104–106, 305, 306, 301–304; 370/537, 277
See application file for complete search history.

(56) References Cited

U.S. PATENT DOCUMENTS

| | | | |
|---|---|---|---|
| 2008/0065805 A1* | 3/2008 | Wu | G06F 1/186 710/301 |
| 2008/0247576 A1 | 10/2008 | Marlowe | |
| 2009/0125642 A1 | 5/2009 | Overby et al. | |
| 2010/0312934 A1* | 12/2010 | Chi | G06F 13/385 710/110 |
| 2011/0156944 A1 | 6/2011 | Ward et al. | |
| 2014/0019653 A1* | 1/2014 | Amchislavsky | G06F 13/42 710/106 |

FOREIGN PATENT DOCUMENTS

| | | | |
|---|---|---|---|
| CN | 101299853 | A | 11/2008 |
| CN | 101464849 | A | 6/2009 |
| CN | 101561792 | A | 10/2009 |
| CN | 101588548 | A | 11/2009 |
| CN | 101895549 | A | 11/2010 |
| CN | 102045334 | A | 5/2011 |
| CN | 102662431 | A | 9/2012 |

\* cited by examiner

DOCKING STATION AND EXTERNAL DEVICE CONTROL METHOD AND SYSTEM UTILIZING THE DOCKING STATION

CROSS-REFERENCE TO RELATED APPLICATIONS

This application is a continuation of International Patent Application No. PCT/CN2013/072510, filed Mar. 13, 2013, which claims priority to Chinese Patent Application No. 201210067125.7, filed Mar. 14, 2012, both of which are hereby incorporated in their entireties.

TECHNICAL FIELD

The present invention relates to the field of electronics, and in particular, to a docking station and an external device control method and system utilizing the docking station.

BACKGROUND

A Mobile High Definition Link (MHL for short) specification is a wired connection standard, based on an MHL technology, for a mobile device. CEC (Consumer Electronics Control) is a control protocol applicable between a variety of audio and video consumer electronic products.

Currently, a mobile device supporting a USB/MHL multiplexing interface has emerged. However, in view of factors such as size and elegant appearance of the mobile device, generally, there is only one USB/MHL multiplexing interface disposed in the mobile device. In the prior art, if the USB/MHL multiplexing interface is externally connected to a docking station (HD Dock) including an independent HDMI interface and USB interface, a USB interface device and an HDMI interface device cannot yet be used simultaneously. For example, when one end of the docking station is connected to the HDMI interface device and the other end of the docking station performs an MHL output, the USB interface of the docking station, if connected to docking station a USB keyboard or a mouse, cannot work.

SUMMARY

Embodiments of the present invention provide a docking station and an external device control method and system utilizing the docking station, which are capable of implementing simultaneous working of devices of two protocols through a same multiplexing interface.

In order to achieve the foregoing objectives, the following technical solutions are adopted in the embodiments of the present invention.

According to one aspect, a docking station is provided, including:

a first protocol/second protocol multiplexing interface for connecting to a main device; at least one first protocol device interface for connecting to a first protocol external device; and at least one second protocol device interface for connecting to a second protocol external device, where the docking station further includes:

a first protocol device interface control module, connected to the first protocol device interface and configured to receive first protocol data sent by the first protocol external device through the first protocol device interface;

a second protocol device interface control module, connected to the second protocol device interface and configured to receive second protocol data sent by the second protocol external device through the second protocol device interface;

a protocol conversion control module, connected to the first protocol device interface control module, the second protocol device interface control module, and a multiplexing interface control module, and configured to convert the first protocol data received by the first protocol device interface control module into the second protocol data and send the second protocol data to the multiplexing interface control module; and the multiplexing interface control module, connected to the protocol conversion control module and the first protocol/second protocol multiplexing interface, and configured to send, through the first protocol/second protocol multiplexing interface, the second protocol data sent by the protocol conversion control module to the main device.

According to another aspect, a main device is provided, including: a first protocol/second protocol multiplexing interface for connecting to a docking station, where the main device further includes:

a multiplexing interface control module, connected to a parsing module and the first protocol/second protocol multiplexing interface, and configured to receive second protocol data sent by the docking station through the first protocol/second protocol multiplexing interface;

the parsing module, connected to the first protocol/second protocol multiplexing interface control module and configured to parse the second protocol data obtained through the multiplexing interface control module;

a key value conversion module, configured to convert the parsed second protocol data into a corresponding key value; and a main control module, connected to the parsing module and the key value conversion module, and configured to send the second protocol data parsed by the parsing module to the key value conversion module.

According to one aspect, an external device control method utilizing a docking station is provided, including:

utilizing a docking station, where the docking station includes: a first protocol/second protocol multiplexing interface for connecting to a main device; at least one first protocol device interface for connecting to a first protocol external device; and at least one second protocol device interface for connecting to a second protocol external device; where the method includes:

receiving first protocol data sent by the first protocol external device through the first protocol device interface; and converting the first protocol data into second protocol data, and sending the second protocol data to the main device through the first protocol/second protocol multiplexing interface.

According to another aspect, an external device control method is provided, including:

Receiving, through a first protocol/second protocol multiplexing interface, second protocol data sent by a docking station; and parsing the second protocol data.

According to one aspect, an external device control system provided in an embodiment of the present invention includes:

a docking station and a main device, where the docking station is the foregoing docking station, and the main device is the main foregoing device.

According to the docking station and the external device control method and system utilizing the docking station provided in the embodiments of the present invention, the docking station is used to convert first protocol data received by a first protocol device interface into second protocol data, and a first protocol/second protocol multiplexing interface is used to send the second protocol data to a main device. In this way, even if both a first protocol interface device and a second protocol interface device are connected to the docking station, there is only one type of protocol data output from the docking station to the main device because of a protocol conversion. Therefore, it is implemented that the first protocol interface device and the second protocol interface device share one multiplexing interface, that is, simultaneous working of devices of two types of protocols through a same multiplexing interface is implemented.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
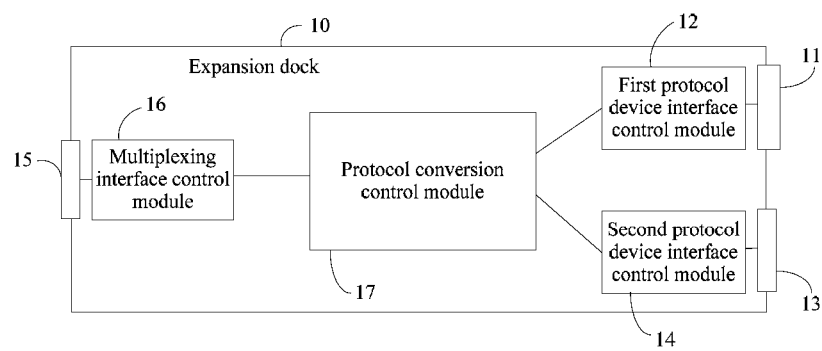
FIG. 1 is a schematic structural diagram of a docking station according to an embodiment of the present invention.

As shown in FIG. 1, a docking station 10 provided in an embodiment of the present invention includes: a first protocol/second protocol multiplexing interface 15 for connecting to a main device; at least one first protocol device interface 11 for connecting to a first protocol external device; and at least one second protocol device interface 13 for connecting to a second protocol external device. Further, the docking station 10 in this embodiment further includes:

a first protocol device interface control module 12, connected to the first protocol device interface 11 and configured to receive, through the first protocol device interface 11, first protocol data sent by the first protocol external device;

a second protocol device interface control module 14, connected to the second protocol device interface 13 and configured to receive, through the second protocol device interface 13, second protocol data sent by the second protocol external device;

a protocol conversion control module 17, connected to the first protocol device interface control module 12, the second protocol device interface control module 14, and a multiplexing interface control module 16, and configured to convert the first protocol data received by the first protocol device interface control module 12 into the second protocol data and send the second protocol data to the multiplexing interface control module 16; and the multiplexing interface control module 16, connected to the protocol conversion control module 17 and the first protocol/second protocol multiplexing interface 15, and configured to send, through the first protocol/second protocol multiplexing interface 15, the second protocol data sent by the protocol conversion control module 17 to the main device.

Figure 2:
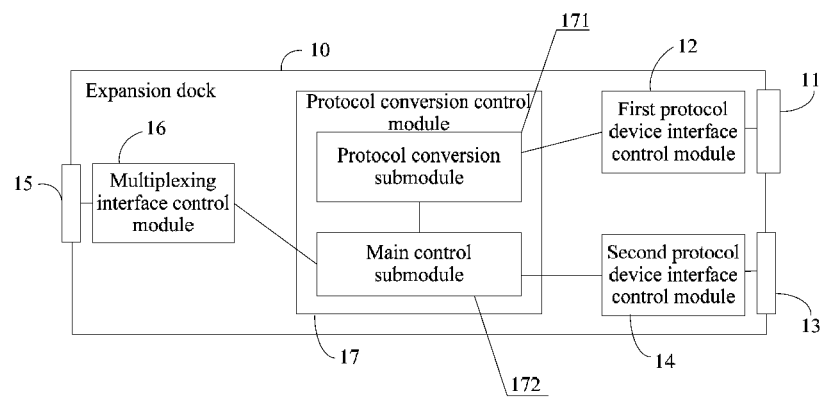
FIG. 2 is a schematic structural diagram of a docking station according to another embodiment of the present invention.

Further, as shown in FIG. 2, the protocol conversion control module 17 may include:

a protocol conversion submodule 171, connected to the first protocol device interface control module and a main control submodule, and configured to convert the first protocol data received by the first protocol device interface control module into the second protocol data and send the converted second protocol data to the main control submodule; and the main control submodule 172, connected to the second protocol device interface control module, the protocol conversion submodule, and the multiplexing interface control module, and configured to send the second protocol data received by the second protocol device interface control module to the multiplexing interface control module and send the second protocol data, obtained after converting by the protocol conversion submodule, to the multiplexing interface control module.

The docking station provided in this embodiment of the present invention converts first protocol data received by a first protocol device interface into second protocol data, and sends the second protocol data to a main device through a first protocol/second protocol multiplexing interface. In this way, even if both a first protocol interface device and a second protocol interface device are connected to the docking station, there is only one type of protocol data output from the docking station to the main device because of a protocol conversion. Therefore, it is implemented that the first protocol interface device and the second protocol interface device share one multiplexing interface, that is, simultaneous working of devices of two types of protocols through a same multiplexing interface is implemented.

Figure 3:
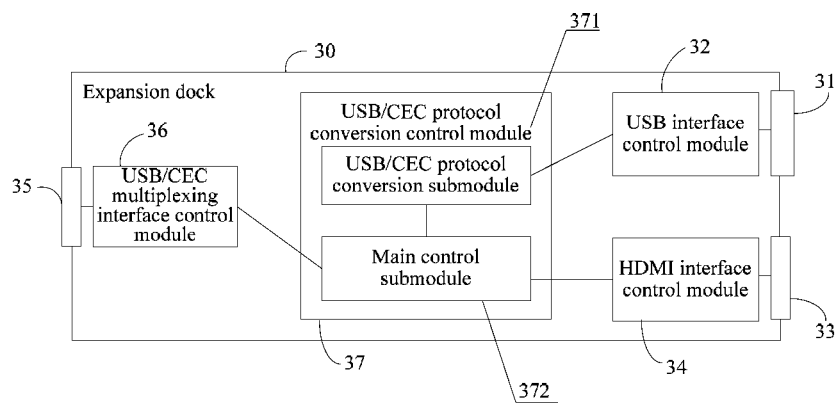
FIG. 3 is a schematic structural diagram of a docking station according to yet another embodiment of the present invention.

As shown in FIG. 3, a docking station 30 provided in another embodiment of the present invention is described using an example in which one end is disposed with a USB/MHL multiplexing interface 35 for connecting to a mobile phone (main device) and the other end is disposed with a USB interface 31 for connecting to a USB interface device and disposed with an HDMI interface 33 for connecting to an HDMI interface device. It should be noted that in this embodiment, there are only one USB interface 31 and one HDMI interface 33, which is merely an example; and there may be multiple USB interfaces 31 and HDMI interfaces 33.

After the USB/MHL multiplexing interface 35 of the docking station 30 is inserted into a USB/MHL multiplexing interface of the mobile phone, a USB device, such as a USB keyboard, is inserted into the USB interface 31; and the HDMI interface device is inserted into the HDMI interface 33.

In this case, a USB interface control module 32 connected to the USB interface 31 receives, through the USB interface 31, USB protocol data sent by the USB keyboard.

An HDMI interface control module 34 connected to the HDMI interface 33 receives, through the HDMI interface 33, CEC protocol data sent by the HDMI interface device.

A USB/CEC protocol conversion control module 37 connected to the USB interface control module 32, the HDMI interface control module 34, and a USB/CEC multiplexing interface control module 36 converts the USB protocol data received by the USB interface control module 32 into CEC protocol data, and sends the CEC protocol data to the USB/CEC multiplexing interface control module 36.

Specifically, the USB/CEC protocol conversion control module 37 includes a USB/CEC protocol conversion submodule 371 and a main control submodule 372 that are connected to each other. The USB/CEC protocol conversion submodule 371 is connected to the USB interface control module 32 and the main control submodule 372, and is configured to convert the USB protocol data received by the USB interface control module 32 into the CEC protocol data and send the converted CEC protocol data to the main control submodule 372. The main control submodule 372 is connected to the HDMI interface control module 34, the USB/CEC protocol conversion submodule 371, and the USB/CEC multiplexing interface control module 36, and is configured to send the CEC protocol data received by the HDMI interface control module 34 to the USB/CEC multiplexing interface control module 36 and send the CEC protocol data, obtained after converting by the USB/CEC protocol conversion submodule 371, to the USB/CEC multiplexing interface control module 36.

The USB/CEC multiplexing interface control module 36 is connected to the main control submodule 372 of the USB/CEC protocol conversion control module 37 and the USB/MHL multiplexing interface 35, and is configured to send, through the USB/MHL multiplexing interface 36, the CEC protocol data sent by the USB/CEC protocol conversion submodule 371 of the USB/CEC protocol conversion control module 37 to the mobile phone.

The following specifically describes how the USB protocol data is converted into the CEC protocol data.

A USB protocol is a set of descriptors that are defined by a USB device, describe device functions and attributes, and have a fixed structure, including a standard descriptor (that is, a device descriptor), a configuration descriptor, an interface descriptor, an endpoint descriptor, a string descriptor, and the like. The USB device reports various attributes of the device to a USB host by using these descriptors, and through access to these descriptors, the host identifies and configures a type of the device and provides a corresponding client driver for the device.

The USB device reflects its own device characteristics by using the descriptor. A USB descriptor is formed by a group of data structures arranged in a specific format.

Each USB device has only one device descriptor, but one device may include one or more configuration descriptors, that is, the USB device may have a plurality of configurations. Each configuration of the device may further include one or more interface descriptors, that is, the USB device may support a plurality of interfaces, and a characteristic of the interface is provided by the descriptor.

The device descriptor provides general information about a USB device, including information which takes effects all the time in the device and device configuration, including a manufacturer identification number ID, a product serial number, a class number to which the device belongs, a maximum packet length of a default endpoint, the number of configuration descriptors, and the like. One USB device must have and only have one device descriptor. The device descriptor is the first descriptor read by the USB host when the device is connected to a bus, the device descriptor includes 14 fields, and a structure may be what is shown in Table 1:

TABLE 1

Structure of a USB device descriptor

| Offset | Field | Size | Value | Description |
|---|---|---|---|---|
| 0 | bLength | 1 | Number | The number of bytes of this description table |
| 1 | bDecriptorType | 1 | Constant | Type of the descriptor (herein the type is 0x01, that is, the device descriptor) |
| 2 | bcdUSB | 2 | BCD code | Version number of a USB device (BCD code) |
| 4 | bDeviceClass | 1 | Class | Device class code: If the value of this field is 0, each interface in a configuration indicates its own class and each interface works independently. If the value of this field is between 1 and FEH, the device supports a different class on a different interface and these interfaces may not work independently. This value indicates a collective class definition of these interfaces. If this field is set to FFH, the class of the device is defined by a vendor. |
| 5 | bDeviceSubClass | 1 | Subclass | Subclass dig code: Specific meanings of these code values depend on the bDeviceClass field. If the bDeviceClass field is zero, this field must also be zero. If the bDeviceClass field is FFH, all values of this field are retained. |

TABLE 1-continued

Structure of a USB device descriptor

| Offset | Field | Size | Value | Description |
|---|---|---|---|---|
| 6 | bDevicePortocol | 1 | Protocol | Protocol code: Values of these codes depend on the value of bDeviceClass and the value of bDeviceSubClass. If the device supports a protocol related to the device class, the code identifies the value of the device class. If the value of this field is zero, the device does not support the protocol related to the device class. However, its interface may support the protocol related to the device class. If the value of this field is FFH, the device uses a protocol defined by the vendor. |
| 7 | bMaxPacketSize0 | 1 | Number | Maximum packet size allowed for endpoint 0. (only 8, 16, 32, and 64 are valid) |
| 8 | idVendor | 2 | ID | Vendor identity (the value is assigned by the USB-IF organization) |
| 10 | idProduct | 2 | ID | Product identity (the value is assigned by the vendor) |
| 12 | bcdDevice | 2 | BCD code | Device release number (BCD code) |
| 14 | iManufacturer | 1 | Index | Index value of a string descriptor describing manufacturer information |
| 15 | iProduct | 1 | Index | Index value of a string descriptor describing product information |
| 16 | iSerialNumber | 1 | Index | Index value of a string descriptor describing serial number information of the device |
| 17 | bNumConfigurations | 1 | Number | Number of possible configuration descriptors |

The bDescriptorType is a type of a descriptor, and for its meaning, reference may be made to Table 2 (the table is also applicable to a value meaning of a high byte in the wValue field in the standard command Get Descriptor):

TABLE 2

Type of USB Descriptors

| Type | Descriptor | Descriptor Value |
|---|---|---|
| Standard descriptor | Device descriptor (Device Descriptor) | 0x01 |
| | Configuration descriptor (Configuration Descriptor) | 0x02 |
| | String descriptor (String Descriptor) | 0x03 |
| | Interface descriptor (Interface Descriptor) | 0x04 |
| | Endpoint descriptor (EndPoint Descriptor) | 0x05 |
| Class descriptor | Hub descriptor (Hub Descriptor) | 0x29 |
| | Human interface descriptor (HID) | 0x21 |
| Descriptor defined by a manufacturer | | 0xFF |

For device class code bDeviceClass, reference may be made to Table 3:

TABLE 3

Class of a USB device

| Value (Decimal) | Value (Hexadecimal) | Description |
|---|---|---|
| 0 | 0x00 | A class value is provided in an interface descriptor |
| 2 | 0x02 | Communications class |
| 9 | 0x09 | Hub class |
| 220 | 0xDC | Device class for a diagnostic purpose |
| 224 | 0xE0 | Wireless communications device class |
| 255 | 0xFF | Device class defined by the manufacturer |

When the USB keyboard is connected to the docking station 30 and a key is pressed, the USB interface control module 32 of the docking station 30 may receive the following data:

```
0x05, 0x01, // USAGE_PAGE (Generic Desktop)
0x09, 0x06, // USAGE (Keyboard)
0xa1, 0x01, // COLLECTION (Application)
0x05, 0x07, // USAGE_PAGE (Keyboard)
0x19, 0xe0, // USAGE_MINIMUM (Keyboard LeftControl)
0x29, 0xe7, // USAGE_MAXIMUM (Keyboard Right GUI)
0x15, 0x00, // LOGICAL_MINIMUM (0)
0x25, 0x01, // LOGICAL_MAXIMUM (1)
0x75, 0x01, // REPORT_SIZE (1)
0x95, 0x08, // REPORT_COUNT (8)
0x81, 0x02, // INPUT (Data,Var,Abs)
0x95, 0x01, // REPORT_COUNT (1)
0x75, 0x08, // REPORT_SIZE (8)
0x81, 0x03, // INPUT (Cnst,Var,Abs)
0x95, 0x05, // REPORT_COUNT (5)
0x75, 0x01, // REPORT_SIZE (1)
0x05, 0x08, // USAGE_PAGE (LEDs)
0x19, 0x01, // USAGE_MINIMUM (Num Lock)
0x29, 0x05, // USAGE_MAXIMUM (Kana)
0x91, 0x02, // OUTPUT (Data,Var,Abs)
0x95, 0x01, // REPORT_COUNT (1)
0x75, 0x03, // REPORT_SIZE (3)
0x91, 0x03, // OUTPUT (Cnst,Var,Abs)
0x95, 0x06, // REPORT_COUNT (6)
0x75, 0x08, // REPORT_SIZE (8)
0x15, 0x00, // LOGICAL_MINIMUM (0)
0x25, 0xFF, // LOGICAL_MAXIMUM (255)
0x05, 0x07, // USAGE_PAGE (Keyboard)
0x19, 0x00, // USAGE_MINIMUM (Reserved (no event indicated))
0x29, 0x65, // USAGE_MAXIMUM (Keyboard Application)
0x81, 0x00, // INPUT (Data,Ary,Abs)
0xc0 // END_COLLECTION
```

Specifically, reference may be made to Table 4 for a correspondence of the data.

For a table corresponding to a USB key value, reference may be made to Table 4, the HID part in the USB protocol.

TABLE 4

USB protocol number value corresponding to a USB key value

| ID (Dec) | ID (Hex) | Name |
|---|---|---|
| 0 | 0 | Reserved |
| 1 | 1 | Keyboard ErrorRollOver9 |
| 2 | 2 | Keyboard POSTFail9 |
| 3 | 3 | Keyboard ErrorUndefined9 |
| 4 | 4 | Keyboard a and A4 |
| 5 | 5 | Keyboard b and B |
| 6 | 6 | Keyboard c and C4 |
| 7 | 7 | Keyboard d and D |
| 8 | 8 | Keyboard e and E |
| 9 | 9 | Keyboard f and F |
| 10 | 0A | Keyboard g and G |
| 11 | 0B | Keyboard h and H |
| 12 | 0C | Keyboard i and I |
| 13 | 0D | Keyboard j and J |
| 14 | 0E | Keyboard k and K |
| 15 | 0F | Keyboard l and L |
| 16 | 10 | Keyboard m and M4 |
| 17 | 11 | Keyboard n and N |
| 18 | 12 | Keyboard o and O4 |
| 19 | 13 | Keyboard p and P4 |
| 20 | 14 | Keyboard q and Q4 |
| 21 | 15 | Keyboard r and R |
| 22 | 16 | Keyboard s and S4 |
| 23 | 17 | Keyboard t and T |
| 24 | 18 | Keyboard u and U |
| 25 | 19 | Keyboard v and V |
| 26 | 1A | Keyboard w and W4 |
| 27 | 1B | Keyboard x and X4 |
| 28 | 1C | Keyboard y and Y4 |
| 29 | 1D | Keyboard z and Z4 |
| 30 | 1E | Keyboard 1 and !4 |
| 31 | 1F | Keyboard 2 and @4 |
| 32 | 20 | Keyboard 3 and #4 |
| 33 | 21 | Keyboard 4 and $4 |
| 34 | 22 | Keyboard 5 and %4 |
| 35 | 23 | Keyboard 6 and ^4 |
| 36 | 24 | Keyboard 7 and &4 |
| 37 | 25 | Keyboard 8 and *4 |
| 38 | 26 | Keyboard 9 and (4 |
| 39 | 27 | Keyboard 0 and )4 |
| 40 | 28 | Keyboard Return (ENTER) |
| 41 | 29 | Keyboard ESCAPE |
| 42 | 2A | Keyboard DELETE (Backspace) |
| 43 | 2B | Keyboard Tab |
| 44 | 2C | Keyboard Spacebar |
| 45 | 2D | Keyboard - and (underscore) |
| 46 | 2E | Keyboard = and 4 |
| 47 | 2F | Keyboard [ and {4 |
| 48 | 30 | Keyboard ] and }4 |
| 49 | 31 | Keyboard \ and \| |
| 50 | 32 | Keyboard Non-US # |
| 51 | 33 | Keyboard ; and :4 |
| 52 | 34 | Keyboard ' and "4 |
| 53 | 35 | Keyboard Grave Accent |
| 54 | 36 | Keyboard and <4 |
| 55 | 37 | Keyboard . and >4 |
| 56 | 38 | Keyboard / and ?4 |
| 57 | 39 | Keyboard Caps Lock |
| 58 | 3A | Keyboard F1 |
| 59 | 3B | Keyboard F2 |
| 60 | 3C | Keyboard F3 |
| 61 | 3D | Keyboard F4 |
| 62 | 3E | Keyboard F5 |
| 63 | 3F | Keyboard F6 |
| 64 | 40 | Keyboard F7 |
| 65 | 41 | Keyboard F8 |
| 66 | 42 | Keyboard F9 |
| 67 | 43 | Keyboard F10 |
| 68 | 44 | Keyboard F11 |
| 69 | 45 | Keyboard F12 |
| 70 | 46 | Keyboard PrintScreen |
| 71 | 47 | Keyboard Scroll Lock |
| 72 | 48 | Keyboard Pause |
| 73 | 49 | Keyboard Insert |
| 74 | 4A | Keyboard Home |
| 75 | 4B | Keyboard PageUp |
| 76 | 4C | Keyboard Delete Forward |
| 77 | 4D | Keyboard End |
| 78 | 4E | Keyboard PageDown |
| 79 | 4F | Keyboard RightArrow |
| 80 | 50 | Keyboard LeftArrow |
| 81 | 51 | Keyboard DownArrow |
| 82 | 52 | Keyboard UpArrow |
| 83 | 53 | Keypad Num Lock |
| 84 | 54 | Keypad /1 |
| 85 | 55 | Keypad * |
| 86 | 56 | Keypad - |
| 87 | 57 | Keypad + |
| 88 | 58 | Keypad ENTER |
| 89 | 59 | Keypad 1 and End |
| 90 | 5A | Keypad 2 and Down |
| 91 | 5B | Keypad 3 and PageDn |
| 92 | 5C | Keypad 4 and Left |
| 93 | 5D | Keypad 5 |
| 94 | 5E | Keypad 6 and Right |
| 95 | 5F | Keypad 7 and Home |
| 96 | 60 | Keypad 8 and Up |
| 97 | 61 | Keypad 9 and PageUp |
| 98 | 62 | Keypad 0 and Insert |
| 99 | 63 | Keypad . and Delete |
| 100 | 64 | Keyboard Non-US \ |
| 101 | 65 | Keyboard Application |
| 102 | 66 | Keyboard Power |
| 103 | 67 | Keypad = |
| 104 | 68 | Keyboard F13 |
| 105 | 69 | Keyboard F14 |
| 106 | 6A | Keyboard F15 |
| 107 | 6B | Keyboard F16 |
| 108 | 6C | Keyboard F17 |
| 109 | 6D | Keyboard F18 |
| 110 | 6E | Keyboard F19 |
| 111 | 6F | Keyboard F20 |
| 112 | 70 | Keyboard F21 |
| 113 | 71 | Keyboard F22 |
| 114 | 72 | Keyboard F23 |
| 115 | 73 | Keyboard F24 |
| 116 | 74 | Keyboard Execute |
| 117 | 75 | Keyboard Help |
| 118 | 76 | Keyboard Menu |
| 119 | 77 | Keyboard Select |
| 120 | 78 | Keyboard Stop |
| 121 | 79 | Keyboard Again |
| 122 | 7A | Keyboard Undo |
| 123 | 7B | Keyboard Cut |
| 124 | 7C | Keyboard Copy |
| 125 | 7D | Keyboard Paste |
| 126 | 7E | Keyboard Find |
| 127 | 7F | Keyboard Mute |
| 128 | 80 | Keyboard Volume Up |
| 129 | 81 | Keyboard Volume Down |
| 130 | 82 | Keyboard Locking Caps Lock |
| 131 | 83 | Keyboard Locking Num Lock |
| 132 | 84 | Keyboard Locking Scroll Lock |
| 133 | 85 | Keypad Comma |
| 134 | 86 | Keypad Equal Sign |
| 135 | 87 | Keyboard International115 |
| 136 | 88 | Keyboard International216 |
| 137 | 89 | Keyboard International317 |
| 138 | 8A | Keyboard International418 |
| 139 | 8B | Keyboard International519 |
| 140 | 8C | Keyboard International620 |
| 141 | 8D | Keyboard International721 |
| 142 | 8E | Keyboard International822 |
| 143 | 8F | Keyboard International922 |
| 144 | 90 | Keyboard LANG125 |
| 145 | 91 | Keyboard LANG226 |
| 146 | 92 | Keyboard LANG330 |
| 147 | 93 | Keyboard LANG431 |
| 148 | 94 | Keyboard LANG532 |
| 149 | 95 | Keyboard LANG68 |
| 150 | 96 | Keyboard LANG78 |

TABLE 4-continued

USB protocol number value corresponding to a USB key value

| ID (Dec) | ID (Hex) | Name |
|---|---|---|
| 151 | 97 | Keyboard LANG88 |
| 152 | 98 | Keyboard LANG98 |
| 153 | 99 | Keyboard Alternate Erase |
| 154 | 9A | Keyboard SysReq/Attention |
| 155 | 9B | Keyboard Cancel |
| 156 | 9C | Keyboard Clear |
| 157 | 9D | Keyboard Prior |
| 158 | 9E | Keyboard Return |
| 159 | 9F | Keyboard Separator |
| 160 | A0 | Keyboard Out |
| 161 | A1 | Keyboard Oper |
| 162 | A2 | Keyboard Clear/Again |
| 163 | A3 | Keyboard CrSel/Props |
| 164 | A4 | Keyboard ExSel |
| 165-175 | A5-CF | Reserved |
| 176 | B0 | Keypad 0 |
| 177 | B1 | Keypad 0 |
| 178 | B2 | Thousands Separator |
| 179 | B3 | Decimal Separator |
| 180 | B4 | Currency Unit |
| 181 | B5 | Currency Sub-unit |
| 182 | B6 | Keypad ( |
| 183 | B7 | Keypad ) |
| 184 | B8 | Keypad { |
| 185 | B9 | Keypad } |
| 186 | BA | Keypad Tab |
| 187 | BB | Keypad Backspace |
| 188 | BC | Keypad A |
| 189 | BD | Keypad B |
| 190 | BF | Keypad C |
| 191 | BF | Keypad D |
| 192 | C0 | Keypad E |
| 193 | C1 | Keypad F |
| 194 | C2 | Keypad XOR |
| 195 | C3 | Keypad ^ |
| 196 | C4 | Keypad % |
| 197 | C5 | Keypad < |
| 198 | C6 | Keypad > |
| 199 | C7 | Keypad & |
| 200 | C8 | Keypad && |
| 201 | C9 | Keypad \| |
| 202 | CA | Keypad \|\| |
| 203 | CB | Keypad : |
| 204 | CC | Keypad # |
| 205 | CD | Keypad Space |
| 206 | CE | Keypad @ |
| 207 | CF | Keypad ! |
| 208 | D0 | Keypad Memory Store |
| 209 | D1 | Keypad Memory Recall |
| 210 | D2 | Keypad Memory Clear |
| 211 | D3 | Keypad Memory Add |
| 212 | D4 | Keypad Memory Subtract |
| 213 | D5 | Keypad Memory Multiply |
| 214 | D6 | Keypad Memory Divide |
| 215 | D7 | Keypad +/− |
| 216 | D8 | Keypad Clear |
| 217 | D9 | Keypad Clear Entry |
| 218 | DA | Keypad Binary |
| 219 | DB | Keypad Octal |
| 220 | DC | Keypad Decimal |
| 221 | DD | Keypad Hexadecimal |
| 222-223 | DE-DF | Reserved |
| 224 | E0 | Keyboard LeftControl |
| 225 | E1 | Keyboard LeftShift |
| 226 | E2 | Keyboard LeftAlt |
| 227 | E3 | Keyboard Left GUI |
| 228 | E4 | Keyboard RightControl |
| 229 | E5 | Keyboard RightShift |
| 230 | E6 | Keyboard RightAlt |
| 231 | E7 | Keyboard Right GUI |
| 232-65535 | E8-FFFF | Reserved |

Specifically, when a number "1" in the USB keyboard is pressed, the USB interface control module 32 parses the corresponding USB protocol data into:

00 00 1E 00 00 00 00 00 //1E indicates that the number 1 is pressed.

Exemplarily, when a value in a Hex file format in a key value correspondence table in the USB protocol in Table 4 is 1E, it indicates that the number 1 is pressed. When a value in the Hex file format is 1F, it indicates that the number 2 is pressed. For other numbers, reference may be made to Table 4 for corresponding parsing. Details are not described herein again.

Herein, a CEC data packet format protocol may be what is shown in Table 5:

Framework Specification of a CEC Table

TABLE 5

CEC data packet format protocol

| Name | Description | Value |
|---|---|---|
| Start | Special start 'bit' | N/A |
| Title block | Source and destination addresses (refer to CEC FIG. 7) | Refer to CEC Table 5 |
| Data block 1 (Operation code block) | Operation code (Optional) | Refer to CEC Table 7 to Table 23 |
| Data block 2 (Operation data block) | Specific operation code of an operation (Optional, depending on an operation code) | Refer to CEC Table 26 |

After repacking key value data reported by the USB keyboard, the USB/CEC protocol conversion submodule 371 converts the key value data into the CEC protocol data and sends the CEC protocol data to the USB/CEC multiplexing interface control module 36.

The USB/CEC multiplexing interface control module 36 sends the converted CEC protocol data to the mobile phone through the USB/MHL multiplexing interface 35 and by using a remote control command protocol in the CEC protocol, where a corresponding protocol is as follows:

CEC 13.13 Remote Control Pass Through

CEC 13.13.1 Messages

The following messages are used for the Remote Control Pass Through feature:

<User Control Pressed>, <User Control Released>

For a key, a format of the protocol is:

<Start><HEADER Block><User Control Pressed>[key]

When the number "1" is pressed, a data packet is converted into:

<Start>0.0.0.0 0x44 0x21

0x21 is a command value in a CEC command table.

Refer to CEC command Table 6. A correspondence table of simple and commonly-used key values of USB corresponds to the following.

TABLE 6

USB protocol data and CEC data packet format protocol that are corresponding to a USB key value

| USB keyboard key | Key value of a USB key (Hex) | CEC command value |
|---|---|---|
| Keyboard selection | 77 | 0x00 |
| KEY_UP | 60 | 0x01 |
| KEY_DOWN | 5A | 0x02 |
| KEY_LEFT | 5C | 0x03 |
| KEY_RIGHT | 5E | 0x04 |
| KEY_1 | 1E | 0x21 |
| KEY_2 | 1F | 0x22 |
| KEY_3 | 20 | 0x23 |
| KEY_4 | 21 | 0x24 |

TABLE 6-continued

USB protocol data and CEC data packet format protocol
that are corresponding to a USB key value

| USB keyboard key | Key value of a USB key (Hex) | CEC command value |
|---|---|---|
| KEY_5 | 22 | 0x25 |
| KEY_6 | 23 | 0x26 |
| KEY_7 | 24 | 0x27 |
| KEY_8 | 25 | 0x28 |
| KEY_9 | 26 | 0x29 |
| KEY_0 | 27 | 0x20 |
| KEY_DOT | 37 | 0x2A |
| KEY_ENTER | 28 | 0x2B |

After receiving data, the mobile phone parses out a corresponding key value from a CEC command Specifically, a CEC virtual keyboard device may be added to the mobile phone, and a corresponding virtual keyboard mapping table may be configured:

```
static unsigned short keypad_keymap_cec[KEYMAP_SIZE] = {
    [KEYMAP_CEC(0x00)] = KEY_SELECT,
    [KEYMAP_CEC(0x01)] = KEY_UP,
    [KEYMAP_CEC(0x02)] = KEY_DOWN,
    [KEYMAP_CEC(0x03)] = KEY_LEFT,
    [KEYMAP_CEC(0x04)] = KEY_RIGHT,
    [KEYMAP_CEC(0x20)] = KEY_0,
    [KEYMAP_CEC(0x21)] = KEY_1,
    [KEYMAP_CEC(0x22)] = KEY_2,
    [KEYMAP_CEC(0x23)] = KEY_3,
    [KEYMAP_CEC(0x24)] = KEY_4,
    [KEYMAP_CEC(0x25)] = KEY_5,
    [KEYMAP_CEC(0x26)] = KEY_6,
    [KEYMAP_CEC(0x27)] = KEY_7,
    [KEYMAP_CEC(0x28)] = KEY_8,
    [KEYMAP_CEC(0x29)] = KEY_9,
    [KEYMAP_CEC(0x2A)] = KEY_DOT,
    [KEYMAP_CEC(0x2B)] = KEY_ENTER,
    ...........
};
```

The mobile phone invokes a key value reporting function, determines a received data packet "<Start> 0. 0. 0. 0 0x44 0x21" as "KEY_1", key "1" information by using the corresponding virtual keyboard mapping table, and then displays content corresponding to key "1" on a screen.

In this embodiment of the present invention, a protocol conversion process is as follows: When the number 1 of a USB key value is pressed, the Hex value 1E in the corresponding USB protocol data is parsed out by using Table 4, the USB protocol data is converted into a corresponding CEC protocol value 0X21 by using the USB/CEC protocol conversion submodule 371, by using Table 6 and a reporting function of the mobile phone, a corresponding CEC data packet is converted into "KEY 1" key "1" information corresponding to the virtual keyboard mapping table, and then the content corresponding to key "1" is displayed on the screen.

In this embodiment, a USB keyboard is used as an example of the USB interface device. However, this embodiment of the present invention is not limited to this, and one or more other USB interface devices may be used.

For example, when a USB mouse is inserted into the docking station, docking station after identifying that the mouse is inserted, the docking station notifies the mobile phone by using a CEC command. In this case, the mobile phone may switch a current focus indicator to a shape of the mouse and switch an application scenario to a state in which it is more suitable for mouse use.

Alternatively, a USB fingerprint identification device, a USB drawing board, or a USB brush may be connected, so as to identify a corresponding track, and display the track, by using the docking station and the mobile phone, on an HDMI interface high definition multimedia display. In combination with a drawing application on the mobile phone, a corresponding drawing function is implemented.

Alternatively, a USB game controller may further be connected, and a game on the mobile phone can be controlled by using the USB game controller.

The docking station provided in this embodiment of the present invention converts USB protocol data received by a USB device interface into CEC protocol data and sends the CEC protocol data to a mobile phone by using a USB/HML multiplexing interface. In this way, even if both a USB interface device and an HDMI interface device are connected to the docking station, there is only one type of protocol data output from the docking station to a main device because of a protocol conversion. Therefore, it is implemented that a USB interface device and an HDMI interface device share one multiplexing interface, that is, simultaneous working devices of two types of protocols through a same multiplexing interface is implemented.

Figure 4:
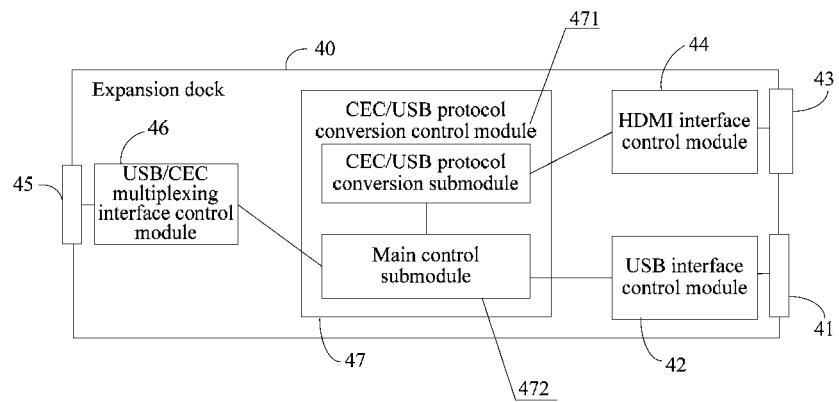
FIG. 4 is a schematic structural diagram of a docking station according to still another embodiment of the present invention.

A docking station 40 provided in yet another embodiment of the present invention, as shown in FIG. 4, is described using an example in which one end is disposed with a USB/MHL multiplexing interface 45 for connecting to a mobile phone (main device), and the other end is disposed with a USB interface 41 for connecting to a USB interface device and disposed with an HDMI interface 43 for connecting to an HDMI interface device. It should be noted that in this embodiment, there are only one USB interface 41 and one HDMI interface 43, which is merely an example; and there may be multiple USB interfaces 41 and HDMI interfaces 43.

The docking station 40 provided in this embodiment and the docking station 30 provided in the previous embodiment are basically the same in structure. The only difference is that the docking station 40 provided in this embodiment converts CEC protocol data of the HDMI interface device into USB protocol data. Therefore, an internal structure of the docking station is as follow:

As shown in FIG. 4, the docking station further includes:

a USB interface control module 42, connected to the USB interface 41 and configured to receive, through the USB interface 41, USB protocol data sent by the USB interface device;

an HDMI interface control module 44, connected to the HDMI interface 43 and configured to receive, through the HDMI interface 43, CEC protocol data sent by the HDMI interface device;

a CEC/USB protocol conversion control module 47, connected to the USB interface control module 42, the HDMI interface control module 44, and a USB/CEC multiplexing interface control module 46, and configured to convert the CEC protocol data received by the HDMI interface control module 44 into the USB protocol data and send the USB protocol data to the USB/CEC multiplexing interface control module 46, where specifically, the CEC/USB protocol conversion control module 47 may include: a CEC/USB protocol conversion submodule 471, connected to the HDMI interface control module 44 and a main control submodule 472, and configured to convert the CEC protocol data received by the HDMI interface control module 44 into the USB protocol data and send the converted USB protocol data to the main control submodule 472; and the main control submodule 472, connected to the USB interface control module 42, the CEC/USB protocol conversion submodule 471, and the USB/MHL multiplexing interface control module, and configured to send the USB protocol data received by the USB interface control module 42 to the USB/CEC multiplexing interface control module 46 and send the USB protocol data, obtained after converting by the CEC/USB protocol conversion module 471, to the USB/CEC multiplexing interface control module 46; and the USB/CEC multiplexing interface control module 46, connected to the CEC/USB protocol conversion control module 47 and the USB/MHL multiplexing interface 45, and configured to send, through the USB/MHL multiplexing interface 45, the USB protocol data sent by the CEC/USB protocol conversion control module 47, to the main device.

The docking station provided in this embodiment of the present invention converts CEC protocol data received by an HDMI device interface into USB protocol data, and sends the USB protocol data to a mobile phone by using a USB/HML multiplexing interface. In this way, even if both a USB interface device and an HDMI interface device are connected to the docking station, there is only one type of protocol data output from the docking station to a main device because of a protocol conversion. Therefore, it is implemented that a USB interface device and an HDMI interface device share one multiplexing interface, that is, simultaneous working of devices of two types of protocols through a same multiplexing interface is implemented.

Figure 5:
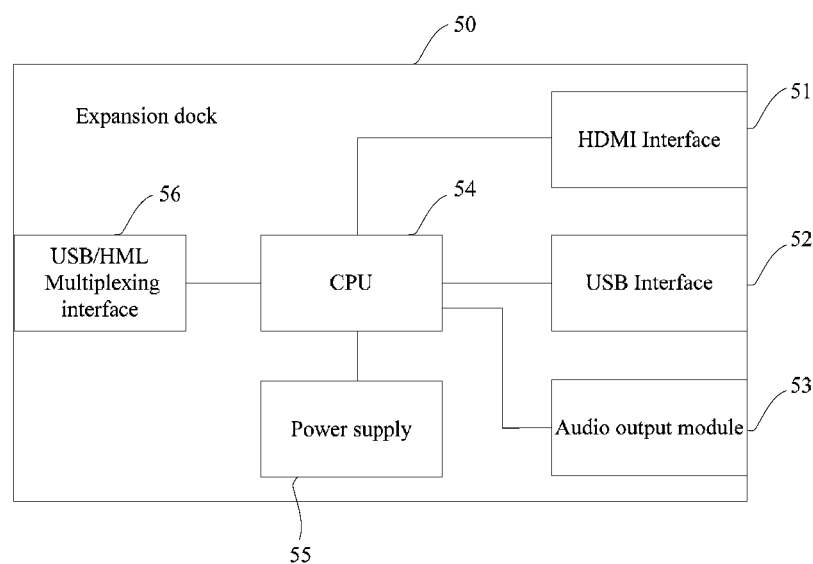
FIG. 5 is a schematic structural diagram of hardware of a docking station according to an embodiment of the present invention.

A docking station 50 product produced in practice, which may be as shown in FIG. 5, implements functions of the USB interface control module, the HDMI interface control module, the CEC/USB protocol conversion submodule, the main control submodule, and the USB/CEC multiplexing interface control module described in the foregoing embodiment by using a CPU 54. In addition, the CPU 54 is further connected to a power supply 55 which supplies power to the CPU 54, a USB/HML multiplexing interface 56, a USB interface 52, and an HDMI interface 51 that perform a data exchange with the CPU 54, and an audio output module 53 for playing audio of the main device.

Figure 6:
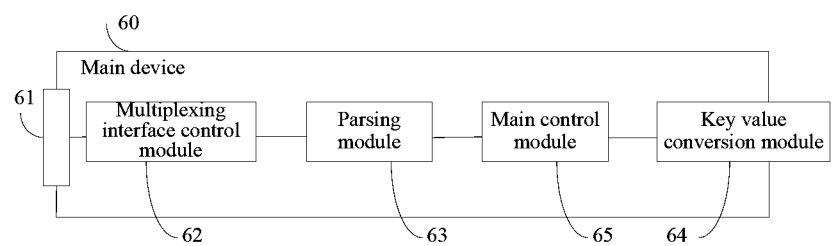
FIG. 6 is a schematic structural diagram of a main device according to an embodiment of the present invention.

As shown in FIG. 6, a main device 60 provided in an embodiment of the present invention includes a first protocol/second protocol multiplexing interface 61 for connecting to a docking station. Further, the main device 60 in this embodiment further includes:

a multiplexing interface control module 62, connected to the parsing module 63 and the first protocol/second protocol multiplexing interface 61, and configured to receive, through the first protocol/second protocol multiplexing interface 61, second protocol data sent by the docking station;

the parsing module 63, connected to the multiplexing interface control module 62 and configured to parse the second protocol data obtained through the multiplexing interface control module 62;

a key value conversion module 64, configured to convert the parsed second protocol data into a corresponding key value; and a main control module 65, connected to the parsing module 63 and the key value conversion module 64, and configured to send the second protocol data parsed by the parsing module 63 to the key value conversion module 64.

According to the main device provided in this embodiment of the present invention, converted second protocol data received through a first protocol/second protocol multiplexing interface is parsed out by a parsing module and is converted into a corresponding key value, thereby implementing parsing and displaying of protocol data.

Figure 7:
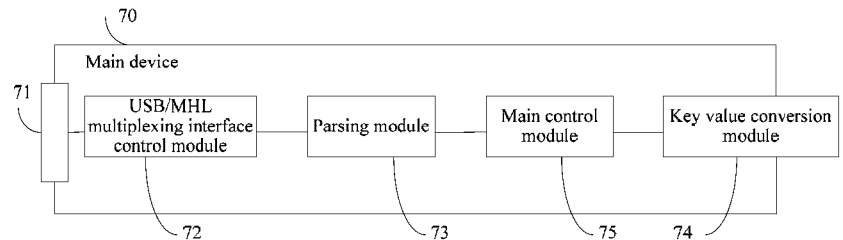
FIG. 7 is a schematic structural diagram of another main device according to an embodiment of the present invention.

As shown in FIG. 7, a main device 70 provided in still another embodiment of the present invention includes a USB/MHL multiplexing interface 71 for connecting to a docking station. Further, the main device 70 in this embodiment further includes:

a USB/MHL multiplexing interface control module 72, connected to the parsing module 73 and the USB/MHL multiplexing interface 71, and configured to receive, through the USB/MHL multiplexing interface 71, second protocol data sent by the docking station;

the parsing module 73, connected to the USB/MHL multiplexing interface control module 72 and configured to parse the second protocol data obtained through the USB/MHL multiplexing interface control module 72;

a key value conversion module 74, configured to convert the parsed second protocol data into a corresponding key value; and a main control module 75, connected to the parsing module 73 and the key value conversion module 74, and configured to send the second protocol data parsed by the parsing module 73 to the key value conversion module 74.

According to the main device provided in this embodiment of the present invention, converted second protocol data received through a first protocol/second protocol multiplexing interface is parsed out by a parsing module and is converted into a corresponding key value, thereby implementing parsing and processing of protocol data.

Figure 8:
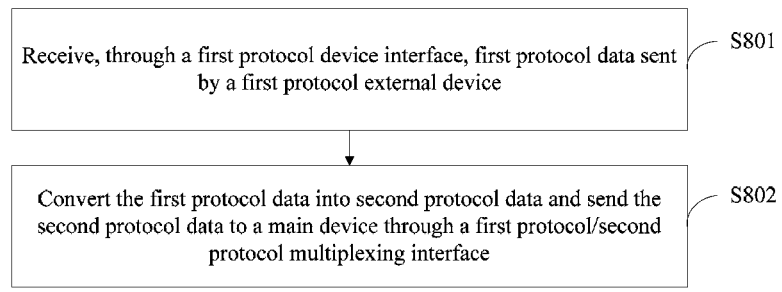
FIG. 8 is a flowchart of an external device control method utilizing a docking station according to an embodiment of the present invention.

An external device control method provided in an embodiment of the present invention utilizes the docking station 10 shown in FIG. 1, where the docking station 10 includes: a first protocol/second protocol multiplexing interface 15 for connecting to a main device; at least one first protocol device interface 11 for connecting to a first protocol external device; and at least one second protocol device interface 13 for connecting to a second protocol external device. As shown in FIG. 8, steps of the method include:

S801: Receive, through the first protocol device interface 11, first protocol data sent by the first protocol external device.

S802: Convert the first protocol data into second protocol data, and send the second protocol data to the main device through the first protocol/second protocol multiplexing interface 15.

Further, the docking station 30 shown in FIG. 3 is used as an example. The docking station 30 specifically includes: a USB/MHL multiplexing interface 35 for connecting to the main device; at least one USB interface 31 for connecting to a USB interface device; and at least one HDMI interface 33 for connecting to an HDMI interface device. The method specifically includes:

S801': Receive, through the USB interface 31, USB protocol data sent by the USB interface device.

S802': Convert the USB protocol data into CEC protocol data and send the CEC protocol data to the main device through the USB/MHL multiplexing interface 35.

Alternatively, the docking station 40 shown in FIG. 4 is used as an example. The docking station 40 specifically includes: a USB/MHL multiplexing interface 45 for connecting to the main device; at least one USB interface 41 for connecting to a USB interface device; and at least one HDMI interface 43 for connecting to an HDMI interface device. The method specifically includes:

S801": Receive, through the HDMI interface 43, CEC protocol data sent by the HDMI interface device.

S802": Convert the CEC protocol data into USB protocol data and send the USB protocol data to the main device through the USB/MHL multiplexing interface 45.

According to the external device control method utilizing a docking station provided in this embodiment of the present invention, the docking station is used to convert first protocol data received by a first protocol device interface into second protocol data, and a first protocol/second protocol multiplexing interface is used to send the second protocol data to a main device. In this way, even if both a first protocol interface device and a second protocol interface device are connected to the docking station, there is only one type of protocol data output from the docking station to the main device because of a protocol conversion. Therefore, it is implemented that the first protocol interface device and the second protocol interface device share one multiplexing interface, that is, simultaneous working of devices of two types of protocols through a same multiplexing interface is implemented.

Figure 9:
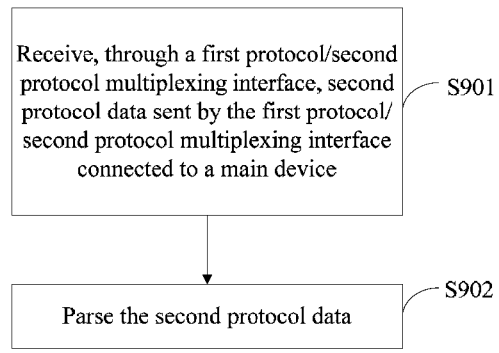
FIG. 9 is a flowchart of an external device control method utilizing a main device according to an embodiment of the present invention.

An external device control method provided in an embodiment of the present invention utilizes the main device 60 shown in FIG. 6, where the main device 60 includes a first protocol/second protocol multiplexing interface 61 for connecting to a docking station. As shown in FIG. 9, steps of the method include:

S901: Receive, through the first protocol/second protocol multiplexing interface 61, second protocol data sent by the docking station.

S902: Parse the second protocol data.

Further, the main device 70 shown in FIG. 7 is used as an example. The main device 70 specifically includes a USB/MHL multiplexing interface 71 for connecting to the docking station. The method includes:

S901': Receive, through the first protocol/second protocol multiplexing interface, second protocol data sent by the docking station.

S902': Parse the second protocol data.

According to the external device control method provided in this embodiment of the present invention, converted second protocol data received by a first protocol/second protocol multiplexing interface is parsed out by using a parsing module and the parsed data is converted into a corresponding key value, thereby implementing parsing and processing of protocol data.

A system provided in an embodiment of the present invention corresponds to the foregoing method embodiments and the embodiments of the docking station and the main device embodiment. Each functional unit of each docking station and main device in the system is applicable to the foregoing steps of the methods. As shown in FIG. 10, the system includes the following docking station and main device:

a docking station 101 and a main device 102, where the docking station 101 may be the docking station shown in FIG. 1 and may perform a technical solution in the method embodiment illustrated in FIG. 8; and the main device 102 may be the main device shown in FIG. 6 and may perform a technical solution in the method embodiment illustrated in FIG. 9. Implementation principles of the technical solutions are similar and are not described herein again.

According to the external device control system utilizing a docking station provided in this embodiment of the present invention, the docking station is used to convert first protocol data received by a first protocol device interface into second protocol data, and the second protocol data is sent to a main device through a first protocol/second protocol multiplexing interface. In this way, even if both a first protocol interface device and a second protocol interface device are connected to the docking station, there is only one type of protocol data output from the docking station to the main device because of a protocol conversion. Therefore, it is implemented that the first protocol interface device and the second protocol interface device share one multiplexing interface, that is, simultaneous working of devices of two types of protocols through a same multiplexing interface is implemented.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A docking station, comprising: a first protocol/second protocol multiplexing interface for connecting to a main device; at least one first protocol device interface for connecting to a first protocol external device; and at least one second protocol device interface for connecting to a second protocol external device, wherein the docking station further comprises:

a first protocol device interface control module, connected to the first protocol device interface and configured to receive, through the first protocol device interface, first protocol data sent by the first protocol external device;

a second protocol device interface control module, connected to the second protocol device interface and configured to receive, through the second protocol device interface, second protocol data sent by the second protocol external device;

a protocol conversion control module, connected to the first protocol device interface control module, the second protocol device interface control module, and a multiplexing interface control module, and configured to convert the first protocol data received by the first protocol device interface control module into the second protocol data and send the second protocol data to the multiplexing interface control module;

the multiplexing interface control module, connected to the protocol conversion control module and the first protocol/second protocol multiplexing interface, and configured to send, through the first protocol/second protocol multiplexing interface, the second protocol data sent by the protocol conversion control module to the main device;

wherein the first protocol/second protocol multiplexing interface comprises: a universal serial bus/mobile high definition link (USB/MIL) multiplexing interface; the first protocol device interface comprises: a USB interface; and the second protocol device interface comprises: a high definition multimedia interface (HDMI) interface;

the first protocol device interface control module comprises: a USB interface control module, connected to the USB interface and configured to receive, through the USB interface, USB protocol data sent by a USB interface device; and the protocol conversion control module comprises: a USB/CEC protocol conversion control module, which is configured to convert the USB protocol data received by the USB interface control module into the CEC protocol data and send the CEC protocol data to the USB/CEC multiplexing interface control module.

2. The docking station according to claim 1, wherein the protocol conversion control module comprises:

a protocol conversion submodule, connected to the first protocol device interface control module and a main control submodule, and configured to convert the first protocol data received by the first protocol device interface control module into the second protocol data and send the converted second protocol data to the main control submodule; and the main control submodule, connected to the second protocol device interface control module, the protocol conversion submodule, and the multiplexing interface control module, and configured to send the second protocol data received by the second protocol device interface control module to the multiplexing interface control module and send the second protocol data obtained, after converting by the protocol conversion submodule, to the multiplexing interface control module.

3. The docking station according to claim 2, wherein;

the second protocol device interface control module is: an HDMI interface control module, connected to the HDMI interface and configured to receive, through the HDMI interface, consumer electronics control (CEC) protocol data sent by an HDMI interface device;

wherein the USB/CEC protocol conversion control module is connected to the USB interface control module, the HDMI interface control module, and a USB/CEC multiplexing interface control module; and the multiplexing interface control module is: the USB/CEC multiplexing interface control module, connected to the USB/CEC protocol conversion control module and the USB/MHL multiplexing interface, and configured to send, through the USB/MHL multiplexing interface, the CEC protocol data sent by the USB/CEC protocol conversion control module to the main device.

4. The docking station according to claim 3, wherein the USB/CEC protocol conversion control module comprises:

the protocol conversion submodule: a USB/CEC protocol conversion submodule, connected to the USB interface control module and the main control submodule, and configured to convert the USB protocol data received by the USB interface control module into the CEC protocol data and send the converted CEC protocol data to the main control submodule; and the main control submodule, connected to the HDMI interface control module, the USB/CEC protocol conversion submodule, and the USB/CEC multiplexing interface control module, and configured to send the CEC protocol data received by the HDMI interface control module to the USB/CEC multiplexing interface control module and send the CEC protocol data, obtained after converting by the USB/CEC protocol conversion submodule, to the USB/CEC multiplexing interface control module.

5. The docking station according to claim 2, wherein the first protocol/second protocol multiplexing interface, for connecting to the main device, in the docking station is: a universal serial bus/mobile high definition link (USB/MHL) multiplexing interface; the first protocol device interface is: a USB interface; and the second protocol device interface is: a high definition multimedia interface (HDMI) interface;

the first protocol device interface control module is: a USB interface control module, connected to the USB interface and configured to receive, through the USB interface, USB protocol data sent by a USB interface device;

the second protocol device interface control module is: an HDMI interface control module, connected to the HDMI interface and configured to receive, through the HDMI interface, consumer electronics control (CEC) protocol data sent by an HDMI interface device;

the protocol conversion control module is: a CEC/USB protocol conversion control module, connected to the USB interface control module, the HDMI interface control module, and a USB/CEC multiplexing interface control module, and configured to convert the CEC protocol data received by the HDMI interface control module into USB protocol data and send the USB protocol data to the USB/CEC multiplexing interface control module; and the multiplexing interface control module is: the USB/CEC multiplexing interface control module, connected to the CEC/USB protocol conversion control module and the USB/MHL multiplexing interface, and configured to send, through the USB/MHL multiplexing interface, the USB protocol data sent by the CEC/USB protocol conversion control module to the main device.

6. The docking station according to claim 5, wherein the CEC/USB protocol conversion control module comprises:

the protocol conversion submodule: a CEC/USB protocol conversion submodule, connected to the HDMI interface control module and the main control submodule, and configured to convert the CEC protocol data received by the HDMI interface control module into the USB protocol data and send the converted USB protocol data to the main control submodule; and the main control submodule, connected to the USB interface control module, the CEC/USB protocol conversion submodule, and the USB/MHL multiplexing interface control module, and configured to send the USB protocol data received by the USB interface control module to the USB/CEC multiplexing interface control module and send the USB protocol data, obtained after converting by the CEC/USB protocol conversion submodule, to the USB/CEC multiplexing interface control module.

7. A main device, comprising: a first protocol/second protocol multiplexing interface for connecting to a docking station, wherein the main device further comprises:

a multiplexing interface control module, connected to a parsing module and the first protocol/second protocol multiplexing interface, and configured to receive, through the first protocol/second protocol multiplexing interface, protocol data sent by the docking station;

the parsing module, connected to the first protocol/second protocol multiplexing interface control module and configured to parse the protocol data obtained through the multiplexing interface control module;

a key value conversion module, configured to convert the parsed protocol data into a corresponding key value;

a main control module, connected to the parsing module and the key value conversion module, and configured to send the protocol data parsed by the parsing module to the key value conversion module;

wherein the first protocol/second protocol multiplexing interface comprises: a universal serial bus/mobile high definition link (USB/MHL) multiplexing interface; the docking station comprises: a high definition multimedia interface (HDMI) interface and a USB interface for connecting to a USB interface device; and wherein USB protocol data sent by the USB interface device is received through the USB interface; and the USB protocol data is converted into consumer electronics control (CEC) protocol data which is sent to the main device through the USB/MHL multiplexing interface.

8. The main device according to claim 7, the multiplexing interface control module is: a USB/MHL multiplexing interface control module, connected to the parsing module and the USB/MHL multiplexing interface, and configured to receive, through the USB/MHL multiplexing interface, the protocol data sent by the docking station;

the parsing module is connected to the USB/MHL multiplexing interface control module and configured to parse the protocol data obtained through the USB/MHL multiplexing interface control module;

the key value conversion module is configured to convert the parsed protocol data into the corresponding key value; and the main control module is connected to the parsing module and the key value conversion module, and configured to send the protocol data parsed by the parsing module to the key value conversion module.

9. An external device control method utilizing a docking station, wherein the docking station comprises: a first protocol/second protocol multiplexing interface for connecting to a main device; at least one first protocol device interface for connecting to a first protocol external device; and at least one second protocol device interface for connecting to a second protocol external device; and the method comprises:

receiving, through the first protocol device interface, first protocol data sent by the first protocol external device;

converting the first protocol data into second protocol data and sending the second protocol data to the main device through the first protocol/second protocol multiplexing interface;

wherein the docking station further comprises: a universal serial bus/mobile high definition link (USB/MHL) multiplexing interface for connecting to the main device; at least one USB interface for connecting to a USB interface device; and at least one high definition multi-timedia interface (HDMI) interface for connecting to an HDMI interface device; and the method further comprises:

receiving, through the USB interface, USB protocol data sent by the USB interface device; and converting the USB protocol data into consumer electronics control (CEC) protocol data and sending the CEC protocol data to the main device through the USB/MHL multiplexing interface.

10. The method according to claim 9, further comprising:

receiving, through the HDMI interface, consumer electronics control (CEC) protocol data sent by the HDMI interface device; and converting the CEC protocol data into USB protocol data and sending the USB protocol data to the main device through the USB/MHL multiplexing interface.

11. An external device control method utilizing a main device, wherein the main device comprises: a first protocol/second protocol multiplexing interface for connecting to a docking station; and the method comprises:

receiving, through the first protocol/second protocol multiplexing interface, protocol data sent by the docking station; and parsing the protocol data, wherein the first protocol/second protocol multiplexing interface comprises: a universal serial bus/mobile high definition link (USB/MHL) multiplexing interface; the docking station comprises: a high definition multimedia interface (HDMI) interface and a USB interface for connecting to a USB interface device;

wherein USB protocol data sent by the USB interface device is received through the USB interface; and the USB protocol data is converted into consumer electronics control (CEC) protocol data which is sent to the main device through the USB/MHL multiplexing interface.

12. The method according to claim 11, further comprising receiving, through the USB/MHL multiplexing interface, the protocol data sent by the docking station; and parsing the protocol data.

* * * * *

UNITED STATES PATENT AND TRADEMARK OFFICE
CERTIFICATE OF CORRECTION

| | | |
|---|---|---|
| PATENT NO. | : 9,760,523 B2 | Page 1 of 1 |
| APPLICATION NO. | : 14/339064 | |
| DATED | : September 12, 2017 | |
| INVENTOR(S) | : Gu et al. | |

It is certified that error appears in the above-identified patent and that said Letters Patent is hereby corrected as shown below:

In the Specification

Column 18, Line 50, "(USB/MIL)" should read -- (USB/MHL) --.

Column 20, Line 17, "(USB/MIL)" should read -- (USB/MHL) --.

Column 20, Line 18, "(USB/MIL)" should read -- (USB/MHL) --.

Column 20, Line 32, "(USB/MIL)" should read -- (USB/MHL) --.

In the Claims

Column 21, Line 4, the word -- wherein -- is missing after "claim 7".

Signed and Sealed this
Sixth Day of February, 2018

Joseph Matal
*Performing the Functions and Duties of the
Under Secretary of Commerce for Intellectual Property and
Director of the United States Patent and Trademark Office*